UNITED STATES PATENT OFFICE.

JOHN HUTCHINGS, OF LONDON, ENGLAND.

INTERNAL-COMBUSTION MOTOR-ENGINE TURBINE OR REACTION WHEEL.

967,778.  Specification of Letters Patent.  Patented Aug. 16, 1910.

Application filed November 21, 1908. Serial No. 463,836.

*To all whom it may concern:*

Be it known that I, JOHN HUTCHINGS, a subject of the King of Great Britain, residing at Capel House, 62 New Broad street, in the city of London, England, mining and mechanical engineer, have invented certain new and useful Improvements in and Relating to Internal - Combustion Motor-Engine Turbine or Reaction Wheels, of which the following is a specification.

This invention relates to an improved construction of internal combustion motor engine turbine or reaction wheel, wherein a hydrocarbon in admixture with air is exploded or combined within a combustion chamber, and the present invention is particularly designed to simplify the arrangement and reduce the complexity and number of the parts of the mechanism whereby the driving of the turbine or rotor is effected by connecting parts delivering the motive fluid in regulated and controlled streams on to the rotor blades, and whereby this driving having been effected thereby, that fluid is allowed to escape to exhaust or if the apparatus is so modified it is again returned to the internal combustion engine to react therein and be reconverted into motive energy.

The present invention is particularly designed to modify, simplify, render more compact and economical the various parts of the combination of mechanism referred to, and by improving the construction of the individual parts referred to render their coöperation in the cycle of movements more efficient and uniform, resulting in the maintenance of a more even temperature and continuity of stream of motive fluid with uniformity of pressure throughout.

Figure 11:
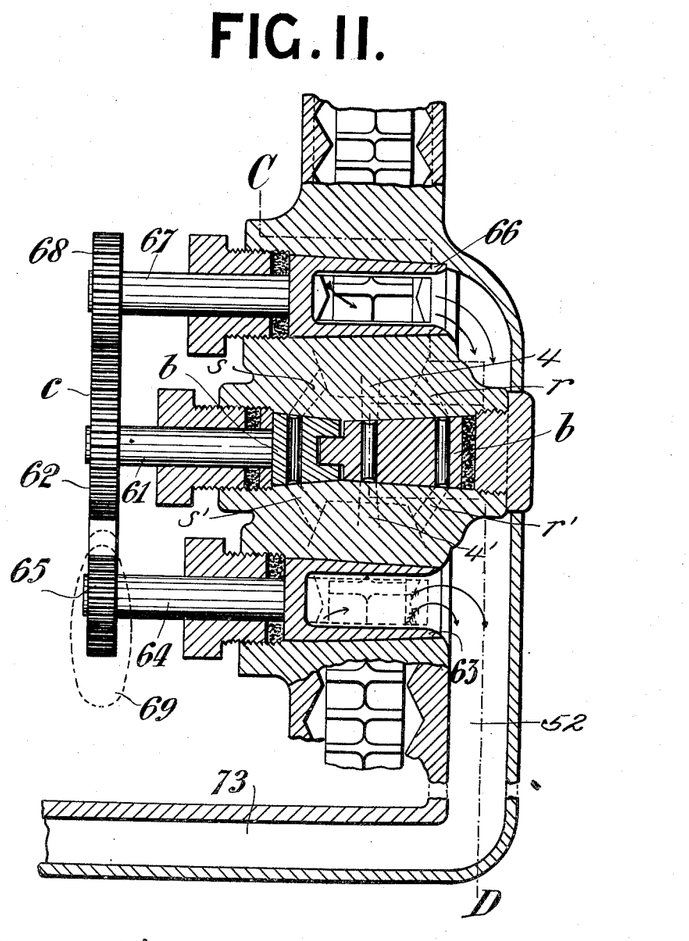
Fig. 11 is a sectional elevation of the supply and exhaust valves and the means for regulating their relative movement, the section being taken on the line E, F, Fig. 3.
Figure 12:
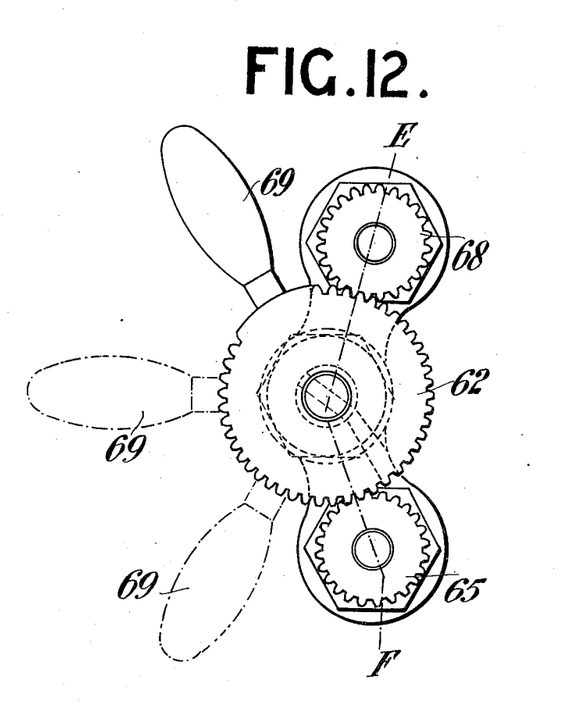
Fig. 12 is a side elevation of the preceding figure.

The driving of the turbine $a$ which is of the reversible type and provided with circumferential or peripherally arranged buckets or vanes 1, 1, inclosed in an annular chamber 2 into which inclined jets of compressed motive fluid are delivered, the direction of delivery being controlled by reversing the valve $b$ for the side delivery nozzles $r$, $r'$ and $s$, $s'$ and intermediate peripheral delivery nozzles 4, 4' (Fig. 2) either single channeled, or as shown multiple channeled, and this multiple channeled inlet valve and the exhaust valves are worked simultaneously as shown by hand gear $c$, (or by lever-arms, or the like). That is to say, referring to Figs. 11, 12 and 13 these three valves viz:—the inlet valve $b$, its spindle 61 and its pinion 62, the forward direction exhaust valve 63 (speaking of direction as that of the clock) its spindle 64 and its pinion 65, and the backward direction valve 66, its spindle 67 and its pinion 68 are all operated, as follows: The pinions 62, 65 and 68 all intermesh. The pinion 62 has connected rigidly to it a handle 69 so that when the valve $b$ is moved forward or back a corresponding motion is imparted to each exhaust valve 63 and 66. When the handle 69 of valve $b$ is turned from the bottom position Figs. 12 and 13 to mid position the exhaust valve 63 is opened and valve 66 correspondingly kept closed. The motive fluid entering the turbine chamber 2 through the valve $b$ is directed to the upper nozzles, 4, $r$, and $s$, and after passing around the top of the wheel it exhausts through the valve 63 to the exhaust passage 52. Further movement of the handle 69 to its top position (full lines Fig. 12) reverses the inlet valve $b$, and exhaust valve 63 is closed and exhaust valve 66 simultaneously opened with the effect that the direction of rotation of turbine is reversed by reason of the reversal of direction of delivery of the currents of motive fluid—the motive fluid so reversed entering by the lower nozzles 4', r' and s' and after first passing around the lower side of the wheel is exhausted by the valve 66 into the same exhaust passage 52.

Figure 1:
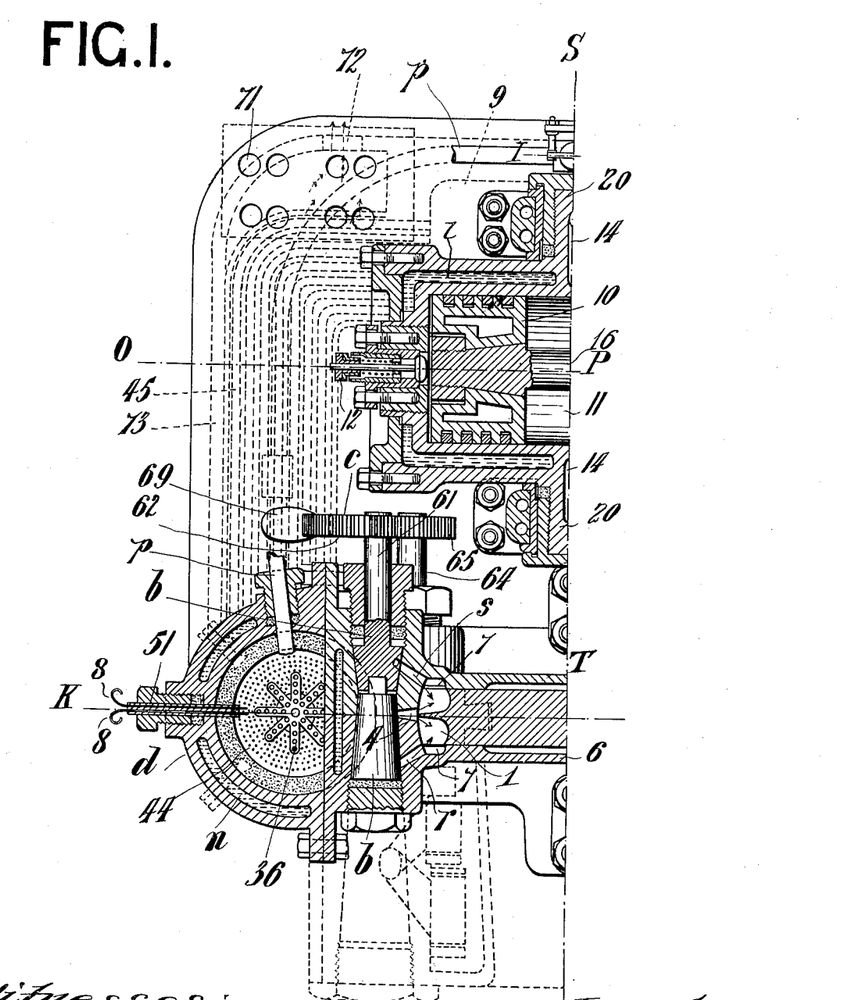
—Figures 1 and 2 show respectively the left hand and right hand half part plan views partly in section taken on the line M, N Figs. 3 and 4.

The products of combustion that have been exhausted into the passage 52 are thence led to the chamber 73 (Fig. 3) below the burner 44 and their direction of flow through this chamber is the opposite of that of the current of the air flowing under pressure through the pipes 45 within said chamber so that the air pipes at their coolest point, that is to say, next the air reservoir 9, will be exposed to the heated products of combustion at a lower temperature than said pipes near the combustion chamber $d$. The air in said pipes thus becomes heated more and more as it approaches the combustion chamber $d$ and the burner 44.

Where higher pressures are called for the respective exhaust currents of exhaust gases are conveyed from the chamber 73 into pipes, as 71, 71, located within the chamber $h$ wherein they part with their heat to the water contained in said chamber $h$, and from these pipes 71 the exhaust gases escape to atmosphere by an opening shown at 72, Fig. 1, in dotted lines, or are condensed.

The reversible turbine $a$ referred to has peripheral radial blades (3) forming with the inclosing annular chamber (2) open-sided circumferential compartments or buckets 1 and these blades 3 are acted upon by the impinging fluid (under pressure) supplied by central nozzles 4, 4, which deliver in an inclined direction, or alternately from side nozzles $r$, $r'$ and $s$, $s'$ which deliver in a direction tangential to the inner face of the casing 6 (these nozzles in either case being supplied from channels 5 opening into the chamber $d$ hereinafter referred to) or these sets of nozzles 4, 4' may deliver laterally from the sides of the said casing, or all these nozzles may be brought into use in combination. The open sided bucket compartments may be continued to any convenient extent in the direction of the axis $e$.

Figure 8:
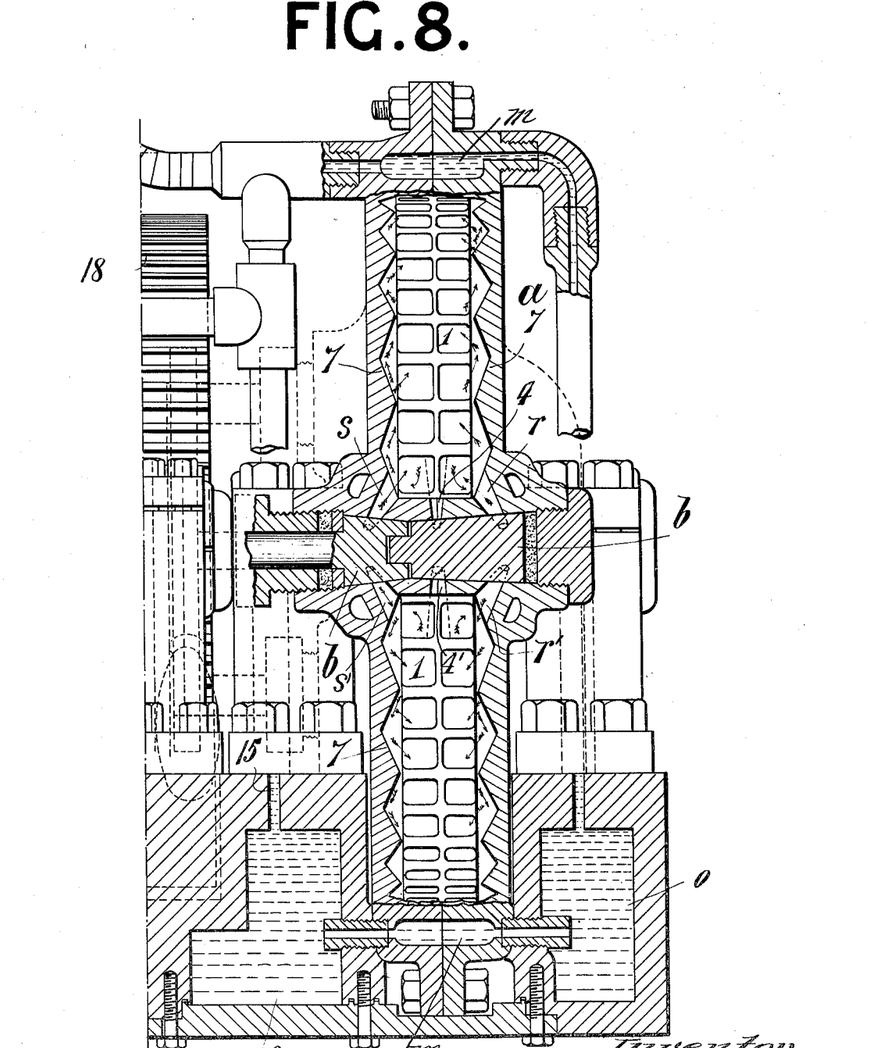

The deflecting surfaces 7, 7, (Fig. 8) are herein shown as being inclined, they may however be curved, and are formed in the walls of the turbine casing 6 adjacent to the side compartments 1, 1, of the turbine upon which the jets of compressed fluid impinge and by which the fluid is guided on to the faces of the blades forming the buckets 1, 1. The deflecting surfaces are arranged at the sides of the wheel in reversely arranged pairs, or series, and each pair of oppositely inclined surfaces 7, 7, is so arranged, that it extends along the side face of the adjacent blades, to a distance equal to two open-sided compartments or buckets 1, 1, and the nozzles 4, 4', $r$, $r'$ and $s$, $s'$ are arranged in a corresponding manner with due provision for effecting reversal of direction of flow and consequent reversal of direction of rotation of the wheel $a$.

Figure 3:
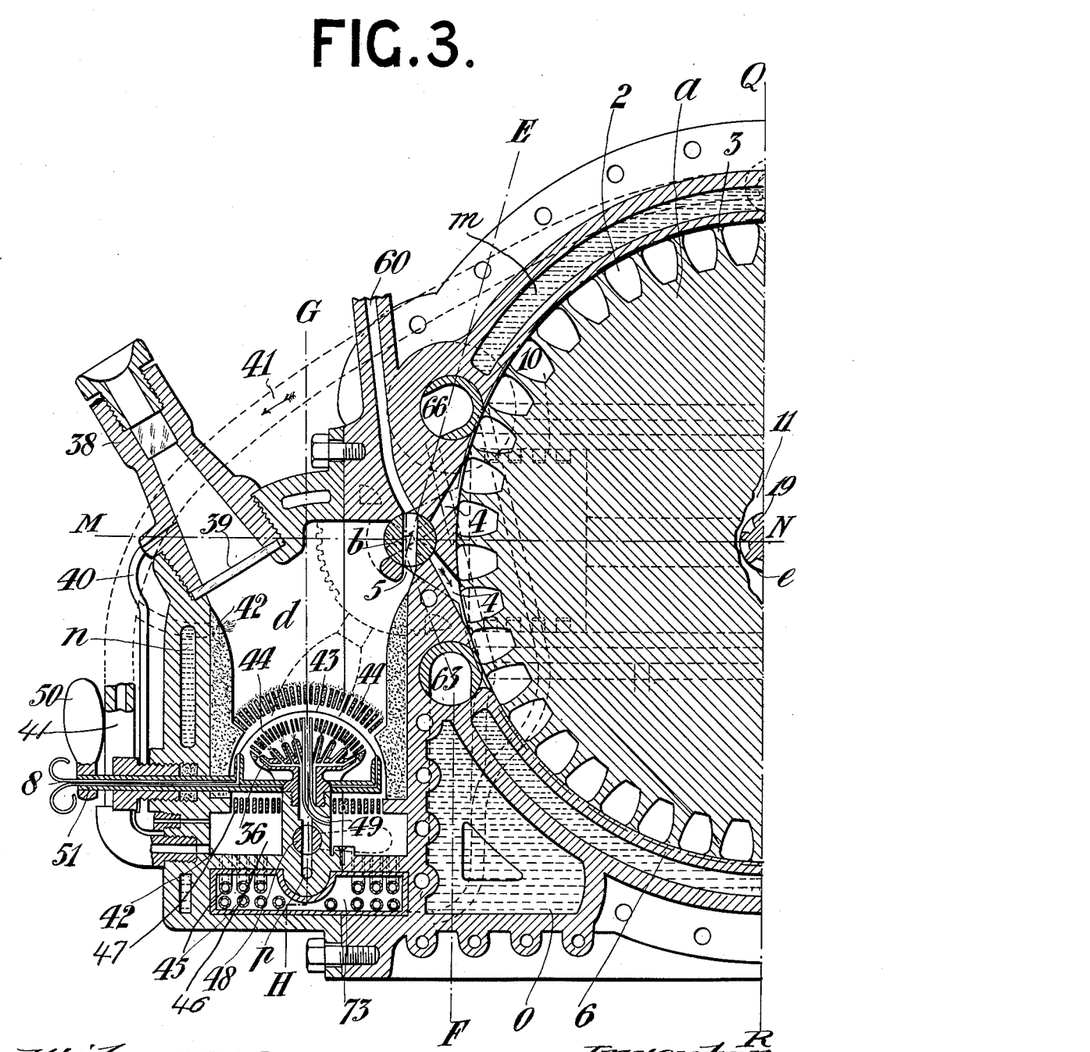
Figs. 3 and 4 are the left hand and right hand half portions respectively, of a side elevation partly in section the section being taken on the line K, L, Figs. 1 and 2.
Figure 4:
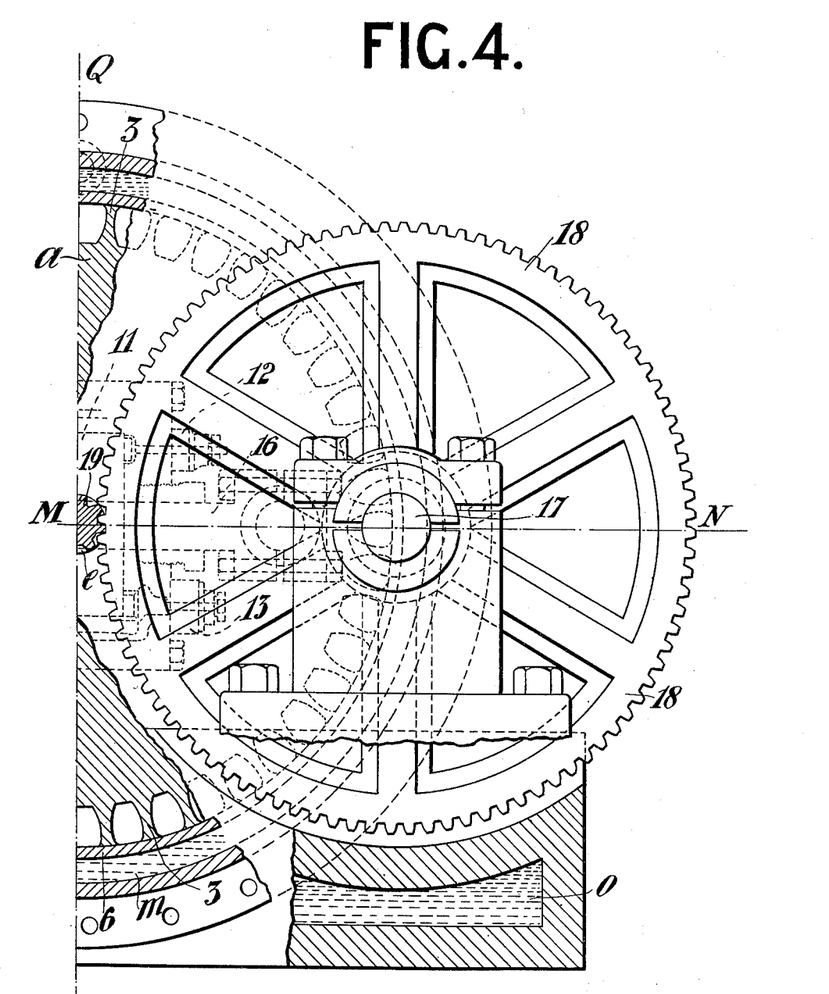
Figure 9:
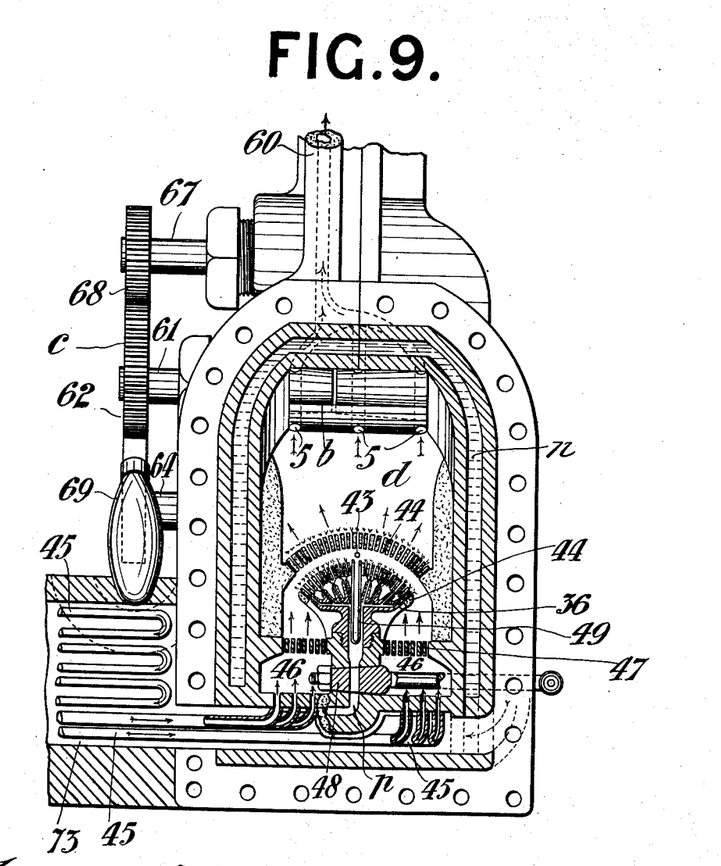
Fig. 9 is a sectional view of the combustion chamber taken on the line G, H, Fig. 3.

The turbine motor fluid is supplied from a chamber $d$ Figs. 1, 3 and 9 within which combustion of a gas and air, hydrocarbon or other combustible matter is effected in combination with regulated quantities of air or its equivalent such as oxygen to bring about combustion, and the products of combustion are thence conveyed through a suitable channel, or as shown channels 5, 5, (Fig. 9) regulated by valve apparatus $b$, $c$, automatically or otherwise actuated. These valves are shown for simplicity hand operated and geared together. The ignition is attained by usual electrical or other means.

Upon first igniting an explosive mixture in the chamber $d$ and prior to the opening up of free communication between it and the turbine the passage 60 is left open by appropriately positioning the valve $b$ so that the products of combustion are free to pass to the atmosphere.

8 indicates the situation of a sparking device consisting of a wire 43 capable of incandescence under the action of electrical energy. The wire can be turned by the button 50 on the axle 51 out of position when not required for sparking.

Figure 5:
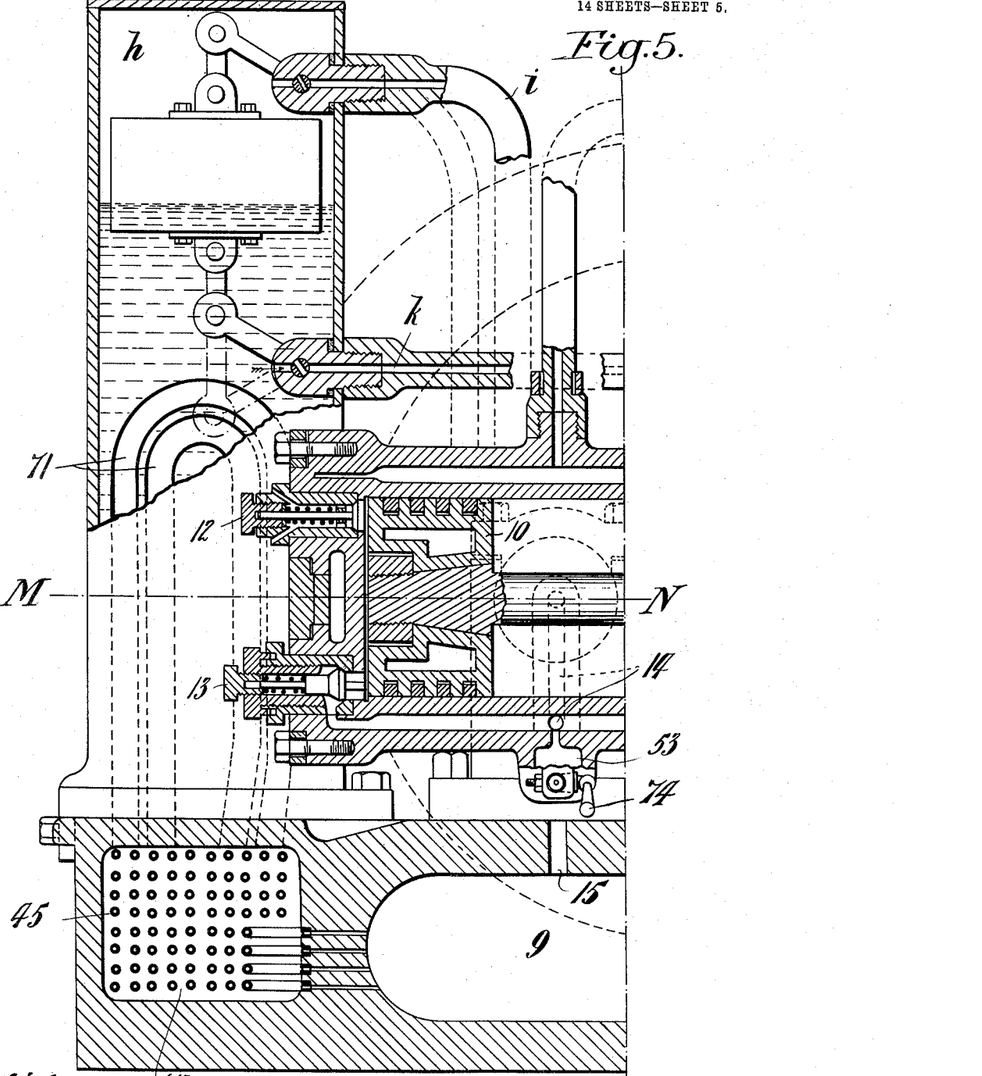
Figs. 5 and 6 are similar views to the preceding figures in sectional elevation of the compressor taken on the line O, P, Figs. 1 and 2.
Figure 6:
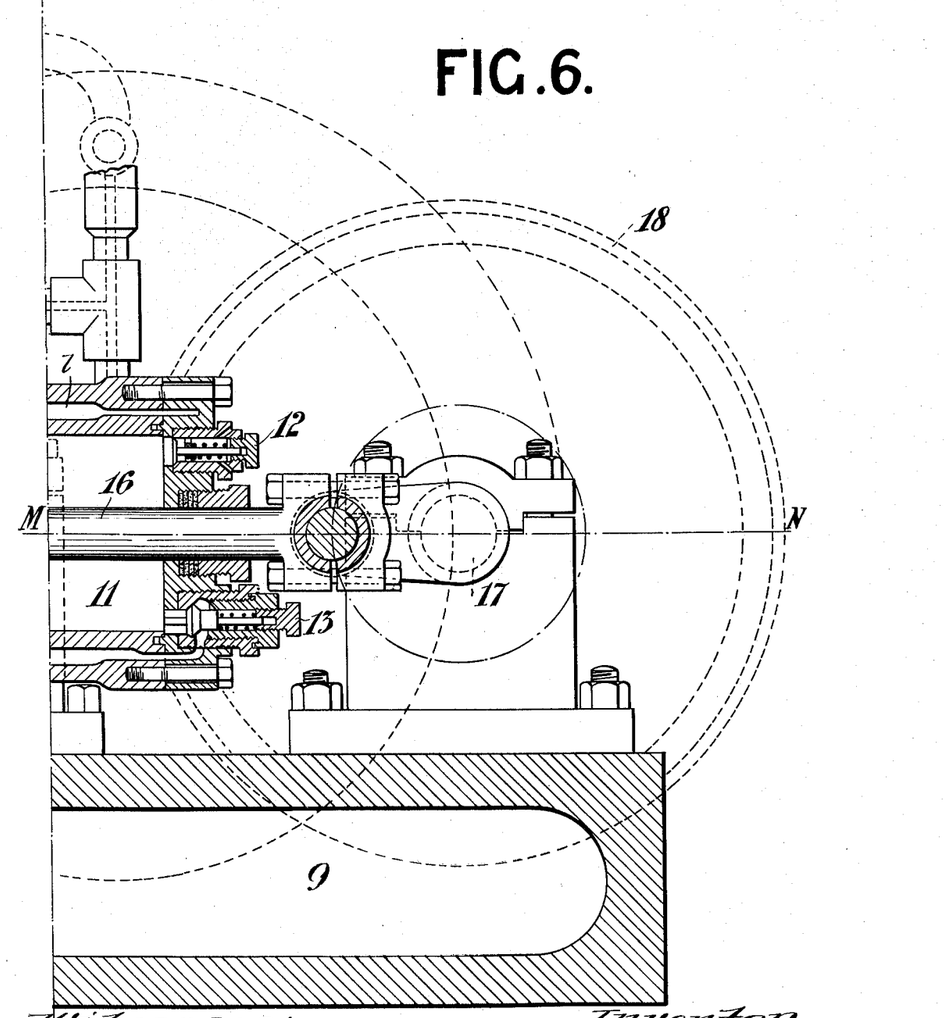
Figure 10:
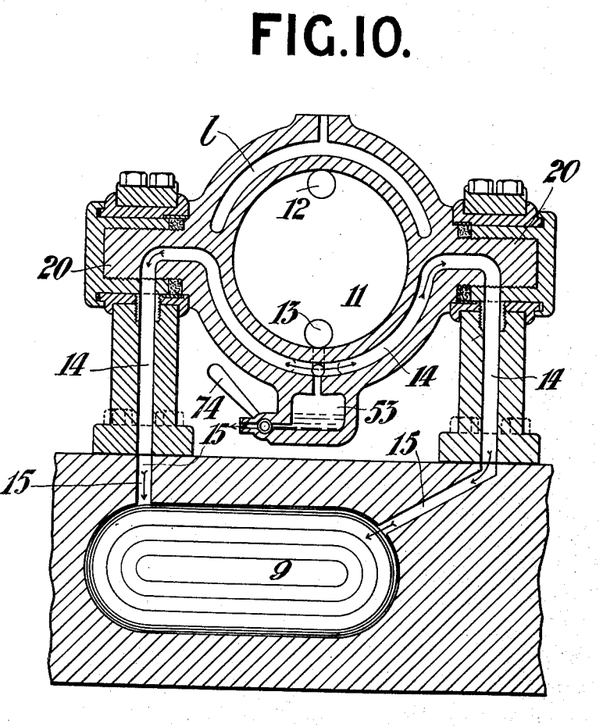
Fig. 10 is a section of the compressor and taken on the line S, T, Fig. 1.

The air for supply to support the combination, or combustion, within the said chamber $d$ is received from a vessel, or first receiver, 9, into which air is forced under high pressure by a compression pump, the piston 10 (or it may be pistons) of which is shown as double acting for economy and uniformity in the supply, 11 is the cylinder thereof, 12, 12, are inlet valves and 13, 13, outlet valves thereto, 14, 14 are passages therefrom uniting in a joint passage 15, Figs. 5, 6 and 10, partly shown by dotted lines, Figs. 5 and 6, and in more detail, in Fig. 10 leading upward and thence down into the reservoir 9. The rod of this pump piston 10 is driven by connections from the crank on the axle 17 of a gear wheel 18 receiving its motion from a pinion 19 on the axle $e$ of the turbine $a$, or receiving motion therefrom in an equivalent manner by like means.

Figure 7:
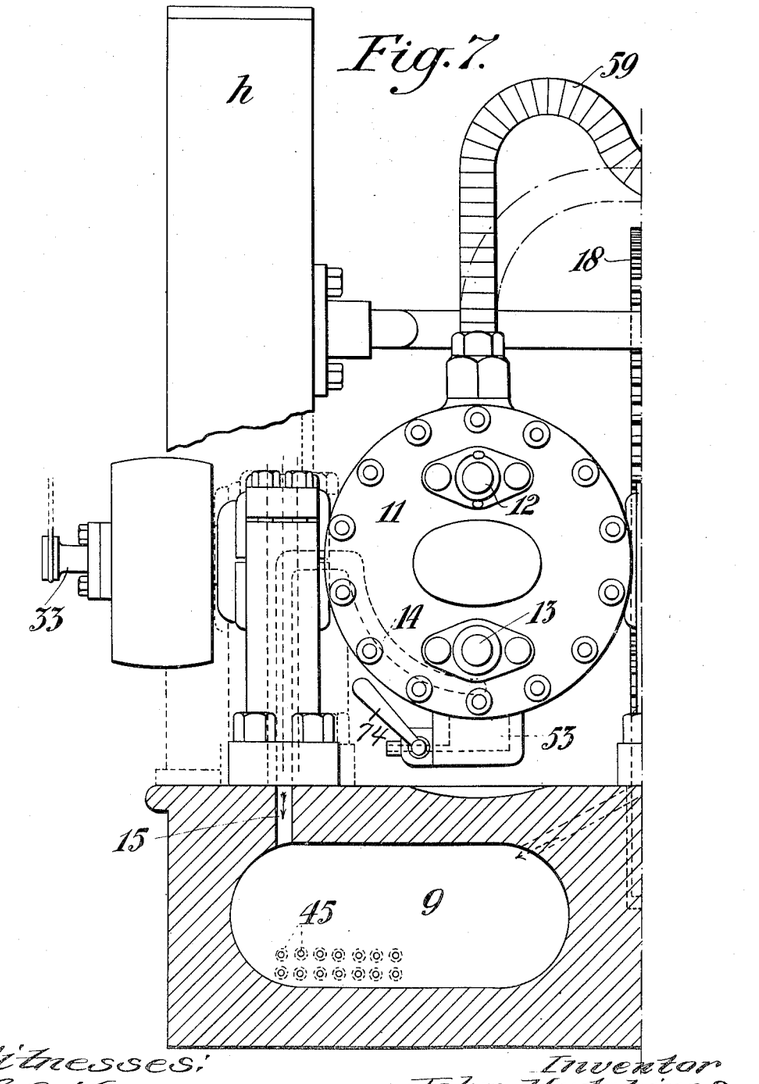
Fig. 7 is the left hand half (in elevation) and Fig. 8 the right hand half (in section) of an end view, the section being taken on the line Q, R, Fig. 3.

To enable the piston 10 and its cylinder 11 to work easily and in a confined space the said cylinder is mounted on trunnions 20, 20 in well understood manner. To accommodate the rocking motion of the cylinder the supply pipe for water cooling for the jacket of the cylinder is made flexible as at 59 Figs. 7 and 8 where the full and dotted lines show the opposite extreme positions of flexure.

Figure 2:
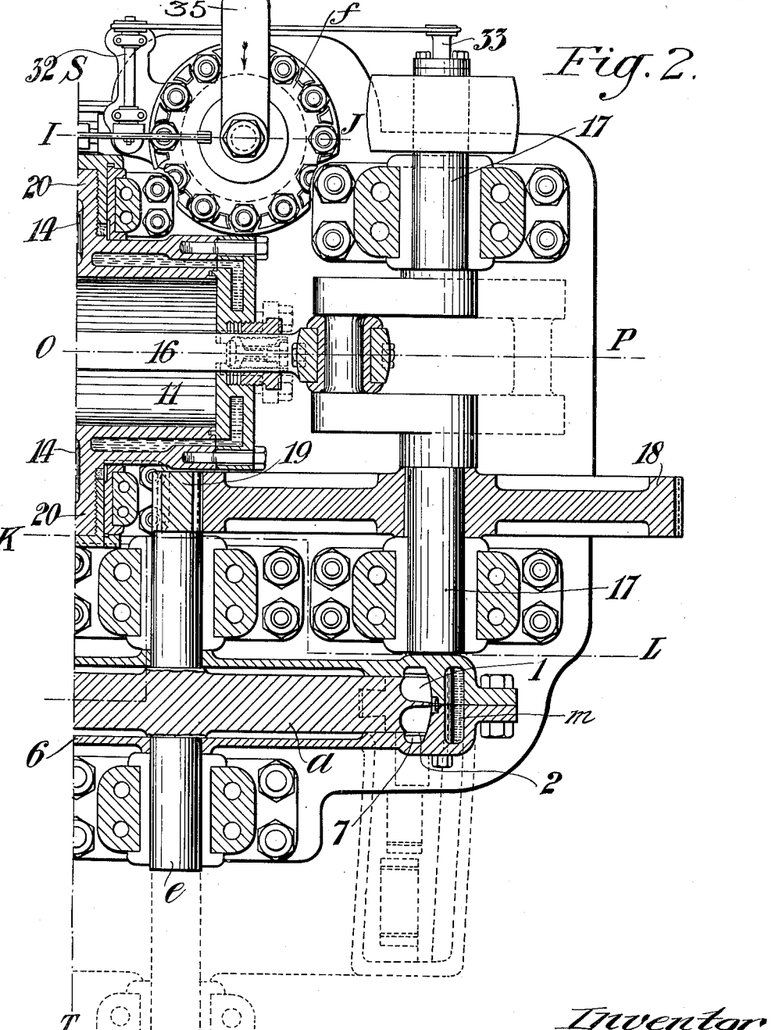

The combustible fluid is supplied from a reservoir *f* suitably positioned, as shown at Fig. 2, having its supply derived from any suitable source by way of a passage leading to a force pump actuated by a cranked axle on a belt-driven shaft 32, or similar device. This shaft 32 is driven by the shaft 17 by means of a pulley 33 driving said belt, and the pressure therein maintained to prevent back flow may be attained by hydrostatic means; or by a pressure pump or the like acting on a piston or diaphragm interposed between the fluid developing the pressure on the oil or combustion-maintaining liquid and said liquid itself. A non-return valve between the combustion chamber and the oil reservoir and also between the air supply reservoir and combustion chamber prevents any back flow.

Figure 13:
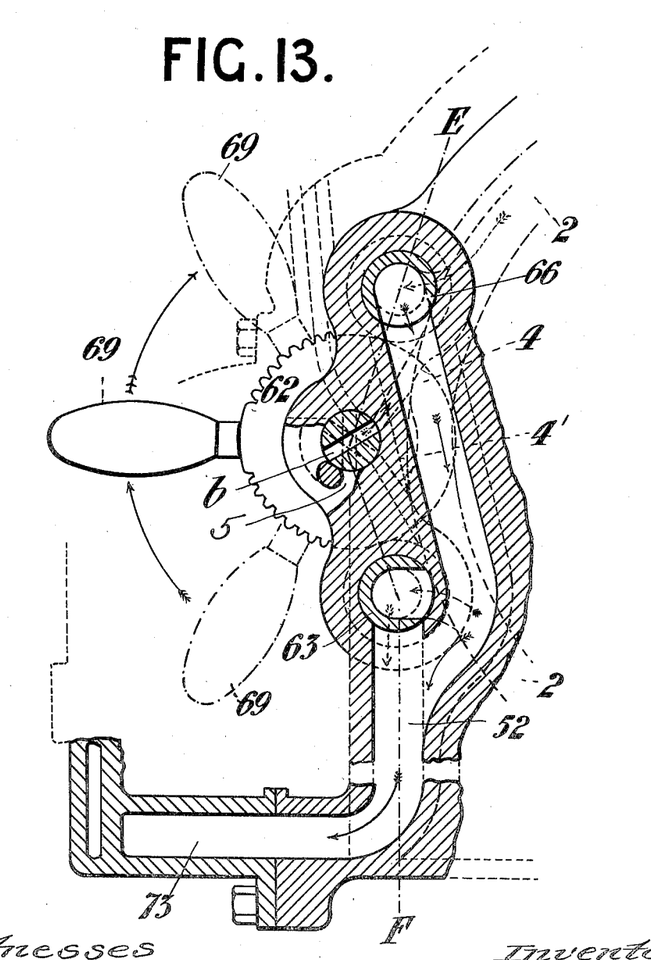
Fig. 13 is a section on the line C, D, Fig. 11 of the inlet and exhaust valves and passages.
Figure 14:
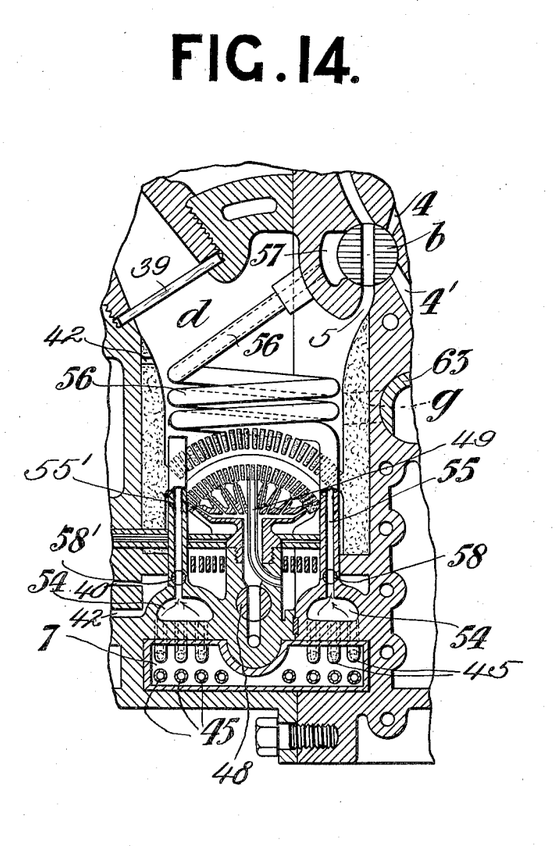
Fig. 14 shows a sectional elevation of a portion of Fig. 3 being the parts adjacent to the combustion chamber, and modified so as to heat the air separately from the gases to support combustion.

Referring to Fig. 14. In this arrangement the compressed air from the reservoir 9 is by means of pipes 45, (carried through the exhaust chamber 73) led into chambers 54 and thence by other pipes 55 into a coil of piping 56 whence the highly heated air is delivered into a valve ante chamber 57 from which it is delivered into one or other of a pair of nozzles 4, 4', oppositely inclined by which the air is propelled on to the vanes of the turbine the selection of direction of delivery being determined by the valve *b*. When this arrangement is employed the products of combustion from the chamber *d* are led directly through the passage *g* indicated by dotted lines and from thence into the exhaust passage 52 (Fig. 13). Such quantity of air as is needed to effect combination or support combustion in the chamber *d* is supplied through the passage 55' (Fig. 14) controlled by a valve 58', the products of combustion, or highly heated gases, instead of being conducted directly on to the turbine *a* or similar device, to impart motion thereto, are conducted around a coil 56, air under pressure being supplied to said coil through the passage 55 which is controlled by a valve 58, and the surrounding heated products of combustion will by imparting their heat to these pipes 56, and to the included air, bring about expansion and enhanced pressure to the jets of motor fluid delivered on to the vanes or buckets of the wheel. In this case the products of combustion pass away through openings one of which *g* is shown by dotted lines, leading from the combustion chamber *d* into the exhaust passage 52.

Means for visual examination of the internal combustion chamber may be provided by a spy tube and lens, as at 38, but this will be well understood. A convenient arrangement is shown in which 39 is a diaphragm of incombustible material of translucent character and to equalize pressure on each side thereof a small communication is made from the inner to the outer face of the diaphragm by way of the channel 40. In some cases I provide a means of modifying the temperature and pressure within the combustion chamber by a controlled inlet for steam or water vapor or spray. Such an inlet pipe 41 having delivery jets 42, 42, one above and one below the level of the burners 36 are shown in Fig. 3.

The air, and fluid of highly combustible character are delivered, in accurately proportioned quantities, within a reticulate or other surface permeable to the mixed air and gases or vapors but not to the flame which is confined to the outer surface of the mantle and effect combustion externally of this surface; or the said fluid may be delivered within the permeable mantle or reticulate surface and the air to support combustion may be independently supplied around said outer surface, with the consequent effect that the mantle or permeable surface becomes highly heated or glows into incandescence or produces a white flare. In Figs. 3 and 9 are shown such a device wherein an ignition wire 43 is located in the chamber formed between the upper and lower surfaces of the "hood" or "mantle" 44, through the orifices in which the combined air and gas under pressure escapes into chamber *d*. The air to the mantle 44 enters the pipes 45 and traverses the coils thereof absorbing heat imparted to them by the escaping products of combustion in the exhaust chamber 73 surrounding them and therefrom the air expands into the chamber 46 and thence passes through the perforated plate 47 which serves to divide the flow and equalize distribution of the air to the point of delivery of the gas entering by the jets 36.

The supply of gas is controlled by the stop cock 48 and the air is similarly controlled by another stop cock (not shown). To insure equalized admixture of the component air and gas forming the combustible medium, a subsidiary air inlet 49 is provided, see Figs. 3 and 9, this inlet leading into the space within the mantle and supplied from the chamber into which the pipes 41 and 45 deliver. The upper end of this pipe 49 is in some cases extended upward so that it contacts with the wire 43 when that wire is swung to its full extent and when the wire 43 is rocked away again for a slight distance the arc is struck and ignition follows. The wire having performed this duty is then further swung on its bearings out of injurious reach of the intense heat of the burner. One permeable chamber or reticulate hood within another similar chamber or hood delivering the gases and air into separate hoods or chambers and effecting combustion of the mixture externally of the outer hood or permeable chamber has many advantages but I do not confine myself to the particular arrangement shown. The air passages 14, 14, leading to the outlets 15, 15, are so arranged as to allow any water which may collect in the compressor cylinders to be drawn off through a water trap 53 (seen in Figs. 5, 6 and 10) of which 74 is the outer cock lever located at the bottom of the compressor outside the water jacketing.

Referring to Figs. 5 and 6, $h$ is the water store tank supplied by pipe $i$ from a suitable source, inflow being controlled by a float and valve arrangement of simple and known construction while $k$ is the outlet which conveys it to the jacket space $l$ over the cylinder 11, to the turbine casing jacket $m$, to the combustion chamber jacket $n$, and to the bed-plate tank or cooling chamber $o$.

Having now particularly described and ascertained the nature of my said invention and in what manner the same is to be performed, I declare that what I claim is:—

1. In an internal combustion motor, the combination of an impact wheel and a casing therefor provided with deflecting surfaces adjacent the blades of said wheel, an inlet valve, an exhaust valve on each side of said inlet valve, said casing having angularly disposed inlet nozzles leading from said inlet valve and directed toward the periphery of said impact wheel and toward said deflecting surfaces, and means for simultaneously operating the inlet and exhaust valves for changing the direction of rotation of said impact wheel.

2. In an internal combustion motor, the combination of an impact wheel and a casing therefor provided with a circular series of deflecting surfaces adjacent the blades of said wheel, an inlet valve, an exhaust valve on each side of said inlet valve, said casing having two sets of angularly disposed inlet nozzles leading from said inlet valve in opposite directions toward the periphery of said impact wheel and toward said deflecting surface for the passage of the motive fluid to rotate said impact wheel in either direction, and means for operating the inlet and exhaust valves for changing the direction of flow of the fluid motor force.

3. In an internal combustion motor, the combination of an impact wheel and a casing therefor, peripheral buckets on said wheel opening on each side and divided centrally by diaphragms, said casing having oppositely inclined deflecting surfaces adjacent said buckets, a combustion chamber, a burner therein for burning hydro-carbon and air, an inlet valve for admitting the products of combustion to said impact wheel, an exhaust valve, an exhaust chamber, and air inlet pipes leading to the burner extending through said exhaust chamber and heated by the escaping products of combustion.

4. In an internal combustion motor, the combination of an impact wheel, a casing therefor, a combustion chamber for burning a hydro-carbon and air, the products of combustion serving to rotate said wheel, an inlet valve, an exhaust valve, means for simultaneously opeating said valves, an exhaust chamber, and air pipes extending therethrough to the combustion chamber in a direction opposite the flow of the products of combustion for the purpose of gradually heating the air in said air pipes as it approaches the combustion chamber.

5. In an internal combustion motor, the combination of an impact wheel, a casing therefor, an inlet valve, said casing having uninterrupted nozzles leading directly from said valve adapted to be opened and closed, in opposite directions to the impact wheel, an exhaust valve on each side of said inlet valve, means for simultaneously operating the inlet and exhaust valves, a combustion chamber, a burner therein for burning an explosive combustible and air under pressure, the heated products of combustion under said pressure serving as motive power for rotating said impact wheel.

6. In an internal combustion motor, the combination of an impact wheel having peripheral buckets divided centrally by a continuous partition, a casing therefor provided with a circular series of deflecting surfaces adjacent each set of blades of said wheel, an inlet valve having ports therethrough, and two sets of angularly disposed inlet nozzles, the nozzles of one set leading upwardly to the deflecting surfaces aforesaid and the central partition dividing the buckets, respectively, and the other nozzles leading downwardly to similar points, the ports in said inlet valve being adapted to register with either set of passages.

7. In an internal combustion motor, the combination of an impact wheel, a casing therefor, a combustion chamber, a burner in said combustion chamber, a pump for forcing a combustible fluid to said burner, a pump for forcing air through a regulating device to said burner, an inlet valve controlling passages in said casing through which the products of combustion of said hydro-carbon may reach said impact wheel and rotate it in one direction or the other, and an exhaust valve on each side of said inlet valve adapted to be opened and closed simultaneously with the movements of the inlet.

8. In an internal combustion motor, the combination of an impact wheel, a casing therefor, inlet and exhaust valves, a combustion chamber, a burner in said chamber, separate means for forcing a hydro-carbon and air to said burner, where they combine and burn, the products of such combustion forming the motive force for rotating the impact wheel, and means for introducing water vapor to the combustion chamber above and below said burner.

9. In an internal combustion motor, the combination of an impact wheel, a casing therefor, inlet and exhaust valves, a combustion chamber, a burner in said chamber, separate means for forcing a hydro-carbon and air to said burner, where they combine and burn, the products of such combustion forming the motive force for rotating the impact wheel, and an electric igniter comprising a heating wire mounted on a rotatable shaft and adapted to be raised above the burner for igniting the hydro-carbon and air and turn to one side of said burner after ignition.

10. In an internal combustion motor, the combination of an impact wheel, a casing therefor, inlet and exhaust valves, a combustion chamber, a burner in said chamber, separate means for forcing a hydro-carbon and air to said burner, where they combine and burn, the products of such combustion forming the motive force for rotating the impact wheel, and a compressed air pipe coil in said combustion chamber above the burner and connected to the seat of the inlet valve.

11. The combination or arrangement with a reversible internal combustion motor engine turbine or reaction wheel having open-sided buckets or vanes arranged around the rotor and inclosed within the annular chamber whose side walls are formed of pairs of oppositely inclined surfaces each pair or span of such surfaces being equal to the width of two compartments of the rotor, said surfaces serving to deflect motive fluid impinging upon them under pressure in inclined directions by corresponding jets from which surfaces the fluid is delivered on to the blades or buckets of the rotor in one or other of opposite directions controlled by reversible simultaneously operated sets of supply and exhaust valves, which valves also control other passages supplying the fluid to the outer part of the buckets, of a chamber whereinto motive fluid composed of combustible matter and air or oxygen combined is fed and ignited, and the resultant products of combustion are conveyed through channels regulated by valves to the jets referred to, there to drive the rotor; means for compressing such air, means for supplying combustible matter and air, and a burner for effecting admixture and combustion of the combustible fluids when under high pressure, substantially as described.

12. In a machine of the kind referred to, a turbine comprising a casing containing a rotor provided with a double series of peripherally arranged radial blades forming buckets, each set of buckets being open only to one side of the casing and the other set to the opposite side of the casing and each so as to face inclined or curved surfaces arranged around this casing on its inner faces adjacent to the bucket mouths each pair of surfaces forming recesses which bridge over two buckets so that motive fluid introduced by suitable jets impinges on these faces, is guided on to the buckets then open to them and therefrom on to the next pair of surfaces and on to the next bucket and so on until the fluid is allowed to escape to exhaust.

In testimony whereof I have hereunto set my hand in presence of two subscribing witnesses.

JOHN HUTCHINGS.

Witnesses:
   John Coode Hore,
   G. F. Warren.